(12) United States Patent
Lee et al.

(10) Patent No.: US 10,425,036 B2
(45) Date of Patent: Sep. 24, 2019

(54) PHOTOVOLTAIC DATA COLLECTION DEVICE

(71) Applicant: LSIS CO., LTD., Anyang-si, Gyeonggi-do (KR)

(72) Inventors: Seong Joon Lee, Gunpo-si (KR); Choong Kun Cho, Gunpo-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 196 days.

(21) Appl. No.: 14/989,719

(22) Filed: Jan. 6, 2016

(65) Prior Publication Data

US 2016/0226440 A1  Aug. 4, 2016

(30) Foreign Application Priority Data

Jan. 30, 2015  (KR) .................. 10-2015-0014856

(51) Int. Cl.
*H02S 50/00* (2014.01)
*H02J 7/00* (2006.01)

(52) U.S. Cl.
CPC ............... *H02S 50/00* (2013.01); *H02J 7/00* (2013.01)

(58) Field of Classification Search
CPC .................................. H02S 50/00; H02J 7/00
USPC ........................................................ 702/62
See application file for complete search history.

(56) References Cited

U.S. PATENT DOCUMENTS

| | | | | |
|---|---|---|---|---|
| 4,636,931 A | * | 1/1987 | Takahashi | H02J 7/35 |
| | | | | 136/293 |
| 9,515,517 B2 | * | 12/2016 | Alonso | H02J 7/35 |
| 9,641,021 B2 | * | 5/2017 | Gong | H02J 7/35 |
| 2011/0088743 A1 | * | 4/2011 | Luo | H02S 50/00 |
| | | | | 136/244 |
| 2012/0256612 A1 | * | 10/2012 | Alonso | H02J 7/35 |
| | | | | 323/311 |

(Continued)

FOREIGN PATENT DOCUMENTS

| CN | 101375408 | 2/2009 |
|---|---|---|
| CN | 101769788 | 7/2010 |
| CN | 102158129 | 8/2011 |

(Continued)

OTHER PUBLICATIONS

Japan Patent Office Application Serial No. 2016-015351, Office Action dated Sep. 13, 2016, 2 pages.

(Continued)

*Primary Examiner* — Huan Hoang
*Assistant Examiner* — Muna A Techane
(74) *Attorney, Agent, or Firm* — K&L Gates LLP

(57) ABSTRACT

A data collection device for photovoltaic power generation is provided. The data collection device according to an embodiment includes a receiver that receives data on an amount of photovoltaic power generation, a storage unit that stores a representative pattern of a graph for monitoring the amount of photovoltaic power generation, a control unit that extracts a graph for a first piece of data on the amount of photovoltaic power generation received by the receiver and compares the extracted graph with the representative pattern stored in the storage unit to extract a pattern comparison value, and a transmitter that transmits the first piece of data compared by the system control unit to an external device.

10 Claims, 11 Drawing Sheets

(56) References Cited

U.S. PATENT DOCUMENTS

2015/0013748 A1* 1/2015 Garabandic .............. G05F 1/67
136/244

FOREIGN PATENT DOCUMENTS

| CN | 102243135 | 11/2011 |
| CN | 203086512 | 7/2013 |
| EP | 2061088 | 5/2009 |
| JP | S6290984 | 4/1987 |
| JP | 2001-352693 | 12/2001 |
| JP | 2010028899 | 2/2010 |
| JP | 2012138448 | 7/2012 |
| JP | 2014082309 | 5/2014 |

OTHER PUBLICATIONS

State Intellectual Property Office of the People's Republic of China Application Serial No. 201610060337.0, Office Action dated Jun. 9, 2017, 8 pages.
European Patent Office Application Serial No. 16150176.2, Search Report dated May 6, 2016, 6 pages.

* cited by examiner

PHOTOVOLTAIC DATA COLLECTION DEVICE

CROSS-REFERENCE TO RELATED APPLICATIONS

Pursuant to 35 U.S.C. § 119(a), this application claims the benefit of earlier filing date and right of priority to Korean Patent Application No. 10-2015-0014856, filed on Jan. 30, 2015 the contents of which are all hereby incorporated by reference herein in its entirety.

BACKGROUND

The present disclosure relates to a photovoltaic device, and particularly to, a device that monitors a photovoltaic power generation result value.

Due to worries about the exhaustion of fossil energy, such as oil and environmental pollution, interest in alternative energy increases. Among others, photovoltaic power generation that uses solar energy to produce electricity on a large scale by spreading, on a large scale, panels to which solar batteries are attached. The photovoltaic power generation has advantages in that there is no need to consume fuel costs and there is no air pollution or waste, because it uses unlimited, pollution-free solar energy.

A solar energy power generation style includes an independent style and a system-associated style. In the system-associated style, a photovoltaic device is connected to a typical power system. When a photovoltaic system generates electricity in daytime, it transmits power and at night or when it rains, the photovoltaic power generation system receives electricity from a system. In order to efficiently use the system-associated photovoltaic system, a photovoltaic system has been introduced which stores idle power in a battery energy storage system (BESS) under a light load, and discharges the BESS to supply discharged power as well as photovoltaic power to the system under a heavy load.

SUMMARY

Embodiments provide a photovoltaic device that delivers minimum data for making a graph to increase monitoring efficiency under the assumption that a daily power generation amount graph of photovoltaic power generation has a certain pattern.

In one embodiment, a data collection device for photovoltaic power generation includes a receiver receiving data on an amount of photovoltaic power generation; a storage unit storing a representative pattern of a graph for monitoring the amount of photovoltaic power generation; a control unit making a graph for monitoring the amount of photovoltaic power generation based on a first piece of data on the amount of photovoltaic power generation received by the receiver and the representative pattern stored in the storage unit; and a transmitter transmitting the graph made by the control unit to an external device.

The control unit may compare the first piece of data with the representative pattern, select a most similar representative pattern as a result of comparison, and make a graph.

The control unit may make a graph based on a graph pattern selected when recently making a graph, when as a result of comparison, a selectable representative pattern is in plurality.

The receiver may further receive a second piece of data on photovoltaic power generation, and the second piece of data may include an exceptional section start time, an exceptional section end time, and a minimum amount of power generation within an exceptional section.

The control unit may compare the second piece of data with a second representative pattern stored in the storage unit (317) to modify an entire graph.

The control unit may receive power generation amount data on all exceptional sections to make the entire graph, when the second piece of data is in plurality.

The first piece of data may include a time at which power generation starts, a time at which power generation ends, and a maximum amount of power generation.

In another embodiment, a photovoltaic system includes a photovoltaic device absorbing and converting solar energy into electrical energy and transmitting converted photovoltaic power generation amount and related data; and a solar data collection device comparing the photovoltaic power generation amount and related data received from the photovoltaic device and making a graph for monitoring photovoltaic power generation based on a result of comparison.

The photovoltaic system may further include an external device that controls the solar data collection device and collects data from the photovoltaic device.

The external device may make a graph for monitoring photovoltaic power generation based on the data collected from the photovoltaic device.

The external device may provide a user with the data collected from the photovoltaic device or the graph for monitoring photovoltaic power generation.

DETAILED DESCRIPTION OF THE EMBODIMENTS

Figure 1:
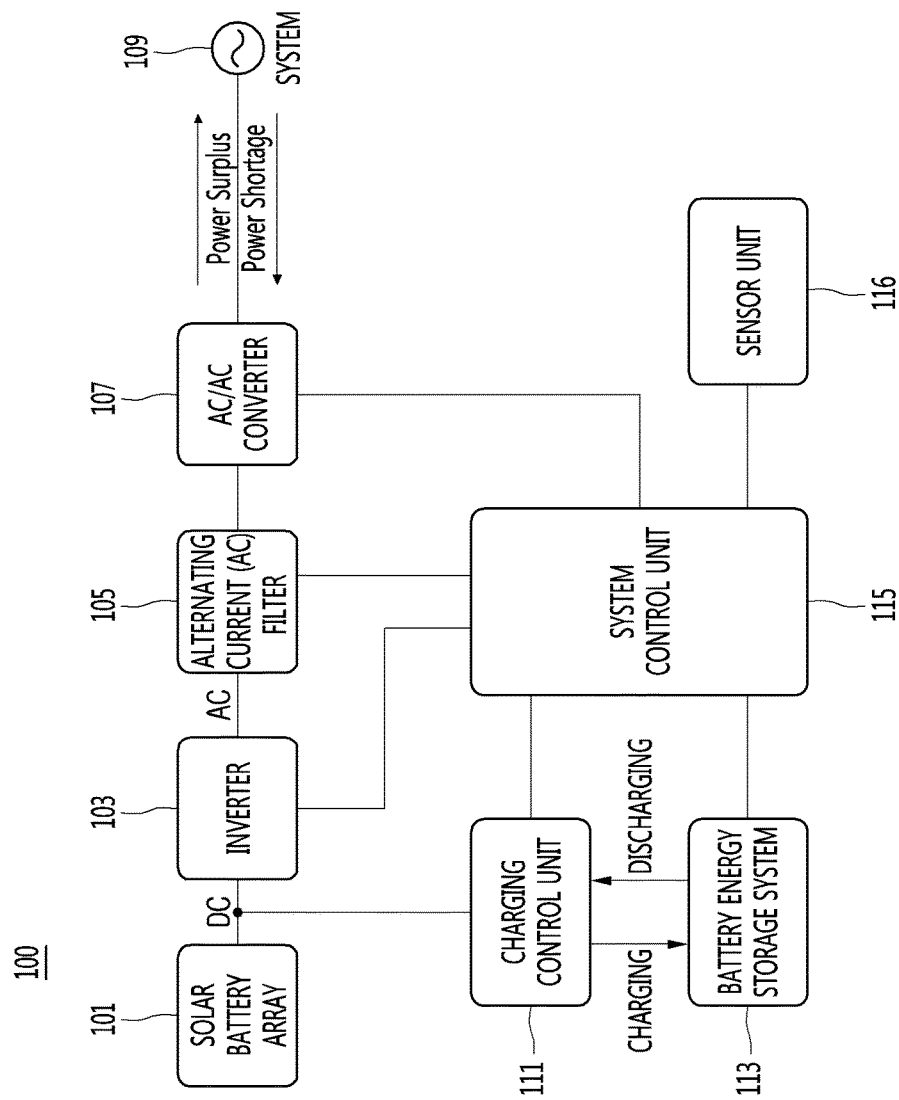
FIG. 1 is a block diagram of a system-associated photovoltaic device according to an embodiment.

Embodiments are described below in detail with reference to the accompanying drawings so that a person skilled in the art may easily practice the embodiments. However, the present disclosure may be implemented in many different forms and is not limited to embodiments that are described herein. In addition, parts irrelevant to descriptions are not provided in the drawings in order to make the present disclosure clear and similar parts throughout the disclosure have similar reference numerals.

Also, when it is described that a part includes some components, it should be understood that it may not exclude but further include other components if there is no specific objection.

In the following, a system-associated photovoltaic device according to an embodiment is described with reference to FIGS. 1 to 3.

FIG. 1 is a block diagram of a system-associated photovoltaic device according to an embodiment.

A system-associated photovoltaic device 100 according to an embodiment includes a solar battery array 101, an inverter 103, an alternating current (AC) filter 105, an AC/AC converter 107, a system 109, a charging control unit 111, a battery energy storage system 113, and a system control unit 115.

The solar battery array 101 is obtained by coupling a plurality of solar battery modules. The solar battery module is a device in which a plurality of solar batteries is connected in series or parallel to convert solar energy into electrical energy to generate a certain voltage and current. Thus, the solar battery array 101 absorbs solar energy to convert it into electrical energy.

The inverter 103 inverts direct current (DC) power into AC power. It receives the DC power supplied by the solar battery array 101 or the DC power discharged by the battery energy storage system 113 through the charging control unit 111 to invert them into AC power.

The AC filter 105 filters the noise of power inverted into the AC power.

The AC/AC converter 107 converts the size of a voltage of the AC power devoid of noise, and supplies the converted power to the system 109.

The system 109 is a system that incorporates many power stations, substations, power transmission and distribution cables, and loads to generate and use power.

The charging control unit 111 controls the charging and discharging of the battery energy storage system 113. When the system is a heavy load, the charging control unit 111 receives power from the battery energy storage system 113 and delivers it to the system. When the system is a light load, the charging control unit 111 receives power from the solar battery array 101 and delivers it to the battery energy storage system 113.

The battery energy storage system 113 receives electrical energy from the solar battery array 101 for charging and discharges the charged electrical energy according to the power supply and demand condition of the system 109. In particular, in the case that the system 109 is a light load, the battery energy storage system 113 receives idle power from the solar battery array 101 for charging. When the system 109 is a heavy load, the battery energy storage system 113 discharges charged power to supply power to the system 109. The power supply and demand condition of the system has a big difference according to the time zone. Thus, it is inefficient that the system-associated photovoltaic device 100 uniformly supplies the power supplied by the solar battery array 101 without consideration of the power supply and demand condition of the system 109. Therefore, the system-associated photovoltaic device 100 uses the battery energy storage system 113 to adjust an amount of power supply according to the power supply and demand of the system 109. Accordingly, the system-associated photovoltaic device 100 may efficiently supply power to the system 109.

The system control unit 115 controls the operations of the charging control unit 111, the inverter 103, the AC filter 105, and the AC/AC converter 107.

The sensor unit 116 senses other elements related to photovoltaic power generation. In this case, the sensor unit 116 may include any one of a sunshine sensor and a temperature sensor. In a particular embodiment, the sensor unit 116 may sense sunshine while photovoltaic power generation is performed. In another embodiment, the sensor unit 116 may sense temperature while photovoltaic power generation is performed.

Figure 2:
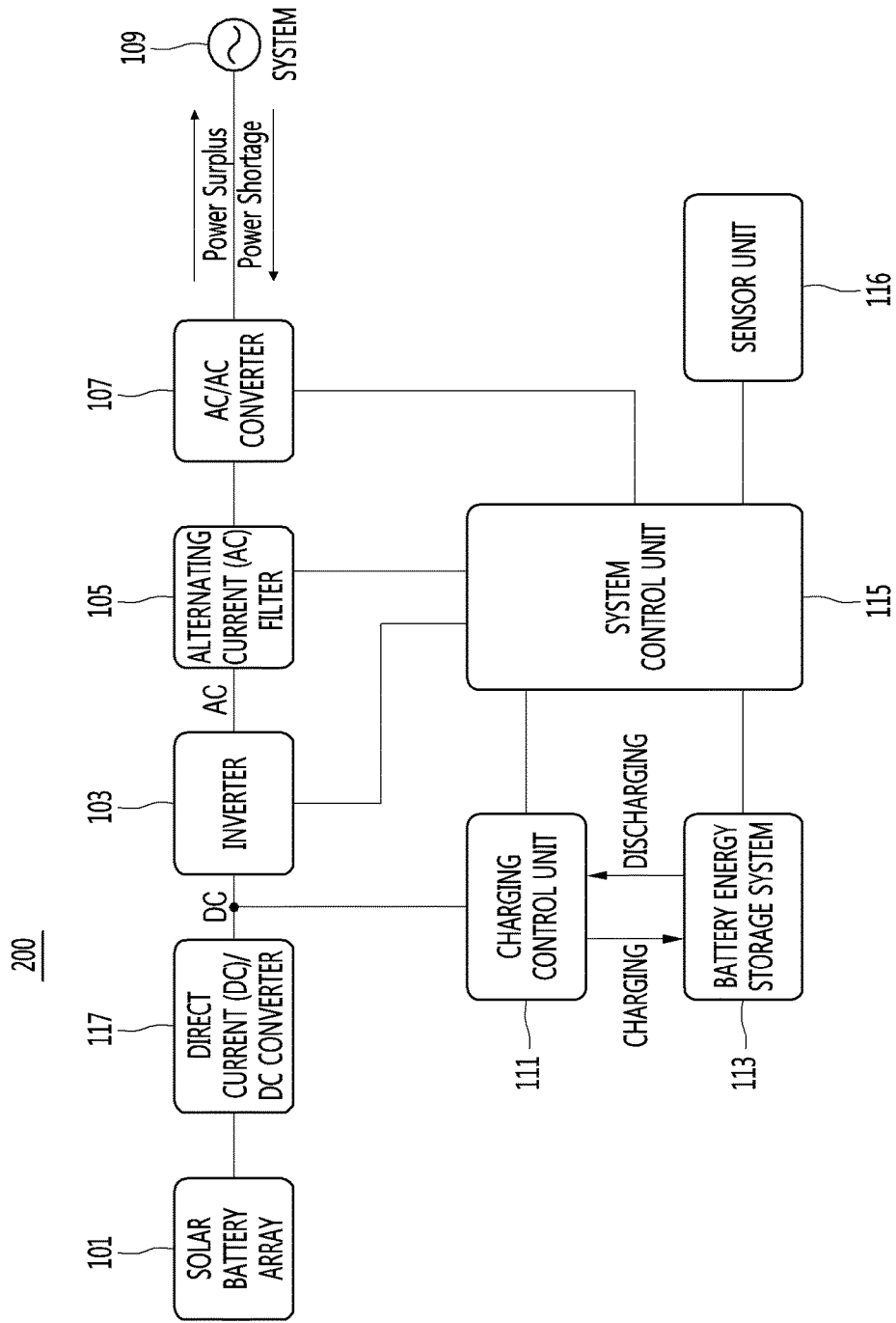
FIG. 2 is a block diagram of a small-capacity system-associated photovoltaic device according to an embodiment.

FIG. 2 is a block diagram of a small-capacity system-associated photovoltaic device according to an embodiment.

A small-capacity system-associated photovoltaic device 200 according to an embodiment includes a solar battery array 101, an inverter 103, an AC filter 105, an AC/AC converter 107, a system 109, a charging control unit 111, a battery energy storage system 113, a system control unit 115, and a DC/DC converter 117.

The present embodiment is the same as the embodiment in FIG. 1 but further includes the DC/DC converter 117. The DC/DC converter 117 converts the voltage of DC power generated by the solar battery array 101. The voltage of power produced by the solar battery array 101 in the small-capacity system-associated photovoltaic device 200 is low. Thus, there is a need to boost the voltage in order to input power supplied by the solar battery array 101 to the inverter. The DC/DC converter 117 converts the voltage of power produced by the solar battery array 101 into a voltage that may be input to the inverter 103.

Figure 3:
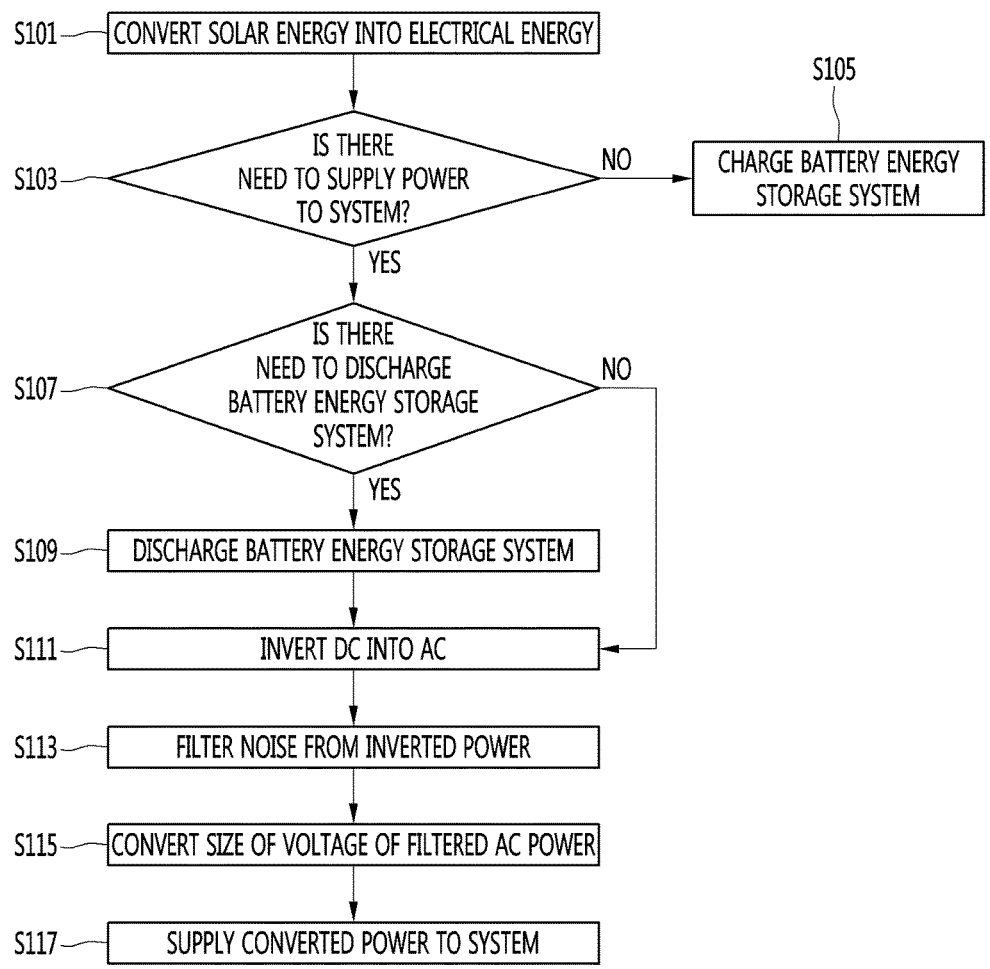
FIG. 3 is a flowchart of the operation of a system-associated photovoltaic device according to an embodiment.

FIG. 3 is a flowchart of the operation of a system-associated photovoltaic device according to an embodiment.

The solar battery array 101 converts solar energy into electrical energy in step S101.

The system control unit 115 determines whether there is a need to supply power to the system 109, in step S103. Whether there is a need to supply power to the system 109 may be determined based on whether the system 109 is a heavy load or light load.

When there is no need to supply power to the system 109, the system control unit 115 controls the charging control unit 111 to charge the battery energy storage system 113, in step S105. In particular, the system control unit 115 may generate a control signal that controls the charging control unit 111. The charging control unit 111 may receive the control signal to charge the battery energy storage system 113.

The system control unit 115 determines whether there is a need to discharge the battery energy storage system 113, in step S107. It is possible to determine whether there is a need to discharge the battery energy storage system 113 because electrical energy supplied by the solar battery array 101 fails to satisfy the power demand of the system 109. Also, the system control unit 115 may determine whether the battery energy storage system 113 stores sufficient electrical energy to be discharged.

When there is a need to discharge the battery energy storage system 113, the system control unit 115 controls the charging control unit 111 to discharge the battery energy storage system 113, in step S109. In particular, the system control unit 115 may generate a control signal that controls the charging control unit 111. The charging control unit 111 may receive the control signal to discharge the battery energy storage system 113.

The inverter 103 inverts electrical energy discharged by the battery energy storage system 113 and electrical energy converted by the solar battery array 101 into AC, in step S111. In this case, the system-associated photovoltaic device 100 inverts both the electrical energy discharged by the battery energy storage system 113 and the electrical energy converted by the solar battery array 101 through a single inverter 103. Each electric appliance has a limit in consumption power. The limit includes an instantaneous limit and a long-term limit, and maximum power that may be used without damage to a device for a long time is defined as rated power. In order to maximize the efficiency of the inverter 103, there is a need to supply power so that the battery energy storage system 113 and the solar battery array 101 use power corresponding to 40% to 60% of the rated power.

The AC filter 105 filters the noise of inverted power, in step S113.

The AC/AC converter 107 converts the size of a voltage of the filtered AC power to supply the converted power to the system 109, in step S115.

The system-associated photovoltaic device 100 supplies converted power to the system in step S117.

Since the system-associated photovoltaic device 100 according to the embodiments in FIGS. 1 to 3 uses only a single inverter 103, there are following limitations when the rated power of the inverter 103 is determined based on the capacity of the solar battery array 101 in order to design the system-associated photovoltaic device 100. When the battery energy storage system 113 discharges electricity and thus supplies electrical energy along with the solar battery array 101, it is difficult to maximize the efficiency of the inverter 103 because the inverter 103 uses power exceeding 40% to 60% of the rated power. Alternatively, when the battery energy storage system 113 discharges electricity and thus supplies electrical energy solely, it is difficult to maximize the efficiency of the inverter 103 because the inverter 103 uses power less than 40% to 60% of the rated power. Besides, when the battery energy storage system 101 supplies a little amount of electrical energy, it is difficult to maximize the efficiency of the inverter 103 because the inverter 103 uses power less than 40% to 60% of the rated power. In this case, the efficiency with which the system-associated photovoltaic device 100 converts solar energy into electrical energy decreases. Also, since the total harmonic distortion (THD) of power increases, the quality of power that the system-associated photovoltaic device 100 produces goes down.

Figure 4:
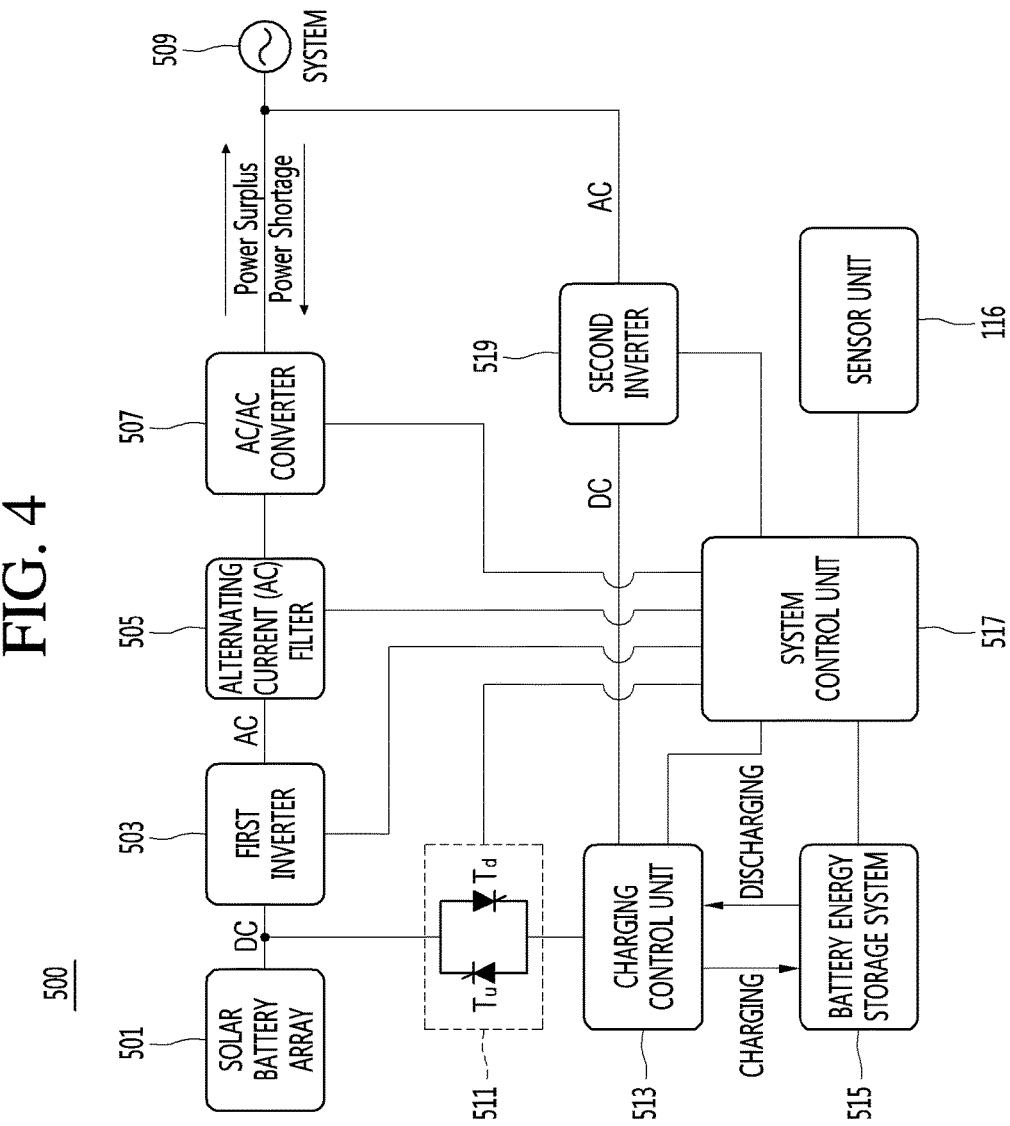
FIG. 4 is a block diagram of a system-associated photovoltaic device according to another embodiment.

FIG. 4 is a block diagram of a system-associated photovoltaic device according to another embodiment.

A system-associated photovoltaic device 500 according to another embodiment includes a solar battery array 501, a first inverter 503, an AC filter 505, an AC/AC converter 507, a system 509, a control switch 511, a charging control unit 513, a battery energy storage system 515, a system control unit 517, and a second inverter 519. Also, it is possible to further include a sensor unit 116.

The solar battery array 501 is obtained by coupling a plurality of solar battery modules. The solar battery module is a device in which a plurality of solar batteries is connected in series or parallel to convert solar energy into electrical energy to generate a certain voltage and current. Thus, the solar battery array 501 absorbs solar energy to convert it into electrical energy.

The first inverter 503 inverts DC power into AC power. It receives the DC power supplied by the solar battery array 501 or the DC power discharged by the battery energy storage system 515 through the charging control unit 513 to invert them into AC power.

The AC filter 505 filters the noise of power inverted into the AC power.

In order to be capable of supplying AC power to the system, the AC/AC converter 507 converts the size of a voltage of the AC power devoid of noise and supplies the converted power to the system 509.

The system 509 is a system that incorporates many power stations, substations, power transmission and distribution cables, and loads to generate and use power.

The control switch 511 adjusts the flow of power supply between the battery energy storage system 515 and the first inverter 503. The control switch 511 receives a control signal from the system control unit 517 to operate according to the control signal. In particular, when the battery energy storage system 515 discharges electricity to supply power to the first inverter 503, the system control unit 517 generates a control signal that connects the control switch 511 and the first inverter 503. The control switch 511 receives the control signal to connect the charging control unit 513 and the first inverter 503. When power is not supplied to the first inverter 503, the system control unit 517 generates a control signal that disconnects the control switch 511 from the first inverter. The control switch 511 receives the control signal to be disconnected from the first inverter 503.

The charging control unit 513 controls the charging and discharging of the battery energy storage system 515. When the system is a heavy load, the charging control unit 513 receives power from the battery energy storage system 515 and delivers it to the system. In this case, the charging control unit 513 may supply power to any one of the first inverter or the second inverter 519 or to both the first inverter 503 and the second inverter 519. When the system is a light load, the charging control unit 513 receives power from the solar battery array 501 and delivers it to the battery energy storage system 515.

The battery energy storage system 515 receives idle power from the solar battery array 501 for charging, when the system is the light load. The battery energy storage system 515 discharges charged power to supply power to the system 509, when the system is the heavy load. As described in the embodiments in FIGS. 1 to 3, the system-associated photovoltaic device 500 may use the battery energy storage system 515 to efficiently power to the system 509.

The system control unit 517 controls the operations of the charging control unit 513, the first inverter 503, the second inverter 519, the AC filter 505, and the AC/AC converter 507.

Unlike the embodiments in FIGS. 1 to 3, the embodiment in FIG. 4 further includes the second inverter 519 that is connected to the battery energy storage system 515.

The second inverter 519 inverts DC power into AC power. It receives the DC power discharged by the battery energy storage system 515 through the charging control unit 513 and inverts the received DC power into AC power. By including the second inverter 519 besides the first inverter 503, the first inverter or the second inverter selectively operates according to the size of power supplied by the system-associated photovoltaic device 500.

Figure 5:
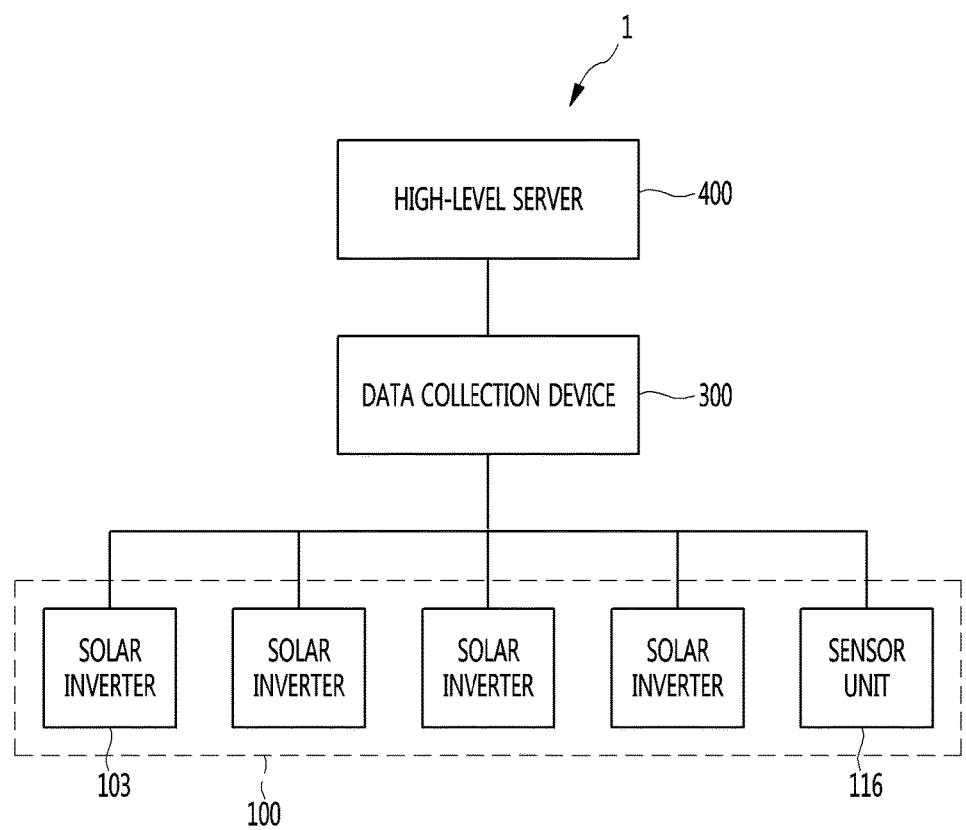
FIG. 5 is a block diagram that represents the configuration of a photovoltaic system.

FIG. 5 is a block diagram that represents the configuration of a photovoltaic system 1.

Referring to FIG. 5, a solar inverter 103 may be included in the photovoltaic device 100. Since the solar inverter 103 has been described above in detail, related descriptions are omitted in FIG. 5. The solar inverter 103 may exist in singularity or in plurality in the photovoltaic device 100. The photovoltaic inverter 103 may deliver an amount of photovoltaic power generation to a data collection device 300.

The sensor unit 116 of the photovoltaic device 100 may deliver sensed data along with the amount of photovoltaic power generation to the data collection device 300. In an embodiment, the sensed data may include at least one of sunshine, temperature, sunrise/sunset time, and a weather condition. The photovoltaic device may deliver power generation time information along with the above-described data to the data collection device 300.

The data collection device 300 receives and synthesizes data from a lower inverter 103 and the photovoltaic device 100. The data collection device 300 may be a component in the photovoltaic device 100 or may be a separate component that is connected to a plurality of photovoltaic devices 100. The data collection device 300 may provide the collected power generation information to users or clients for monitoring. Also, when there is a upper server 400 connected to the plurality of data collection devices 300, it is possible to deliver the collected power generation information to the upper server 400.

Figure 6:
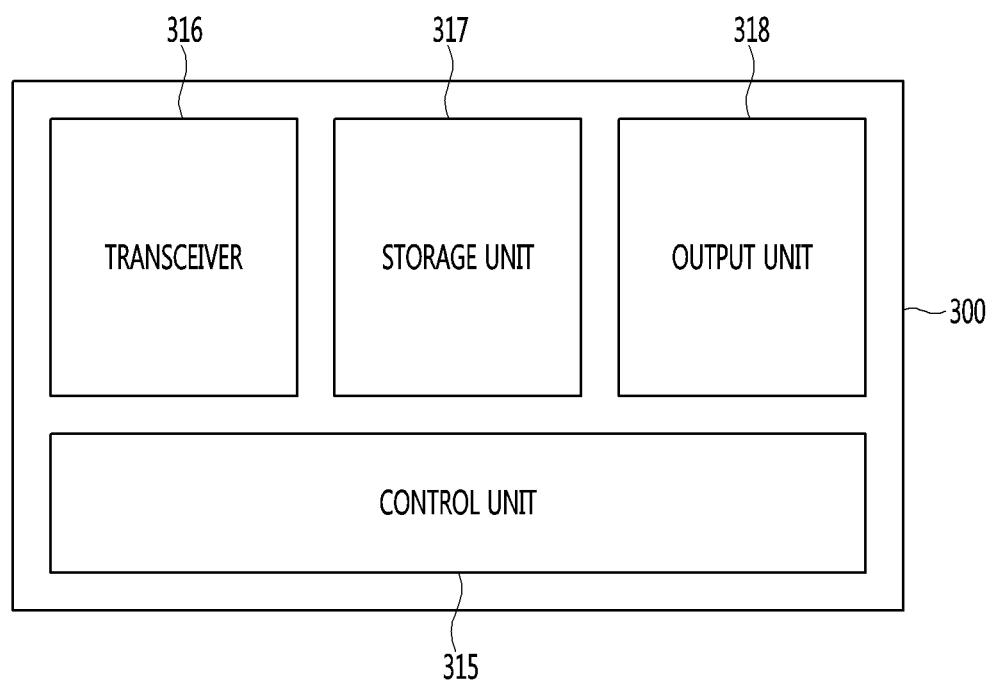
FIG. 6 is a block diagram that represents the configuration of a data collection device.

In the following, the data collection device 300 is described in detail with reference to FIG. 6.

The data collection device 300 may include a control unit 315, a transceiver 316, a storage unit 317, and an output unit 318, as shown in FIG. 5. However, the embodiment is not limited to components in FIG. 5 and may further include other components as needed.

The transceiver 316 receives photovoltaic power generation related data from the photovoltaic device 100 that includes the inverter 103 and various sensors (not shown). A reception method may include both wired and wireless communication methods. When the data collection device 300 is a component in the photovoltaic device 100, it is possible to receive data through a circuit that is connected to between internal components. In particular, the transceiver 316 may receive an amount of photovoltaic power generation from the inverter 103 and deliver the received amount of power generation to the control unit 315.

Also, the transceiver 316 may transmit the collected photovoltaic power generation data to the upper server 400. Likewise, it is possible to transmit the data to the upper server 400 through wired/wireless communication.

Also, the transceiver 316 may also transmit the amount of photovoltaic power generation to users and clients. In particular, it is possible to transmit information for monitoring the amount of power generation to the owner of the photovoltaic device 100 or to an electricity dealer.

Also, the transceiver 316 may also be divided into a transceiver and a receiver.

The storage unit 317 stores the collected power generation data. Photovoltaic power generation is performed everyday, and the data collected by the data collection device 300 is stored in the storage unit 317 for the time being and transmitted to another place. The data stored in the storage unit 317 may be utilized for decreasing transmission data to be described below.

Also, the storage unit 317 stores a representative pattern of a graph that may be referred to in order to make a graph for monitoring an amount of photovoltaic power generation. The stored representative pattern may be in singularity or in plurality with respect to each condition.

The output unit 318 may display data for monitoring the amount of photovoltaic power generation. The output unit may include a display unit that visually displays data, and a speaker that auditorily outputs data.

The control unit 315 controls the operations of the above-described transceiver 316, storage unit 317, and output unit 318. Furthermore, the control unit 315 may process the received data to generate difference data. How to process the data is described below in detail.

Refer back to FIG. 5.

The photovoltaic system 1 may include the upper server 400 to which the plurality of data collection devices 300 are connected. The upper server 400 may synthesize and collect photovoltaic power generation information that is delivered from the plurality of data collection devices 300. In a small-scale photovoltaic system 1, the upper server 400 may not separately exist and the data collection device 300 may also function as the upper server.

An administrator may efficiently manage and control a corresponding system, when operating a large-scale photovoltaic system through the upper server 400. The upper server 400 may control both the lower data collection device 300 and the photovoltaic device 100, and by collecting data from a plurality of photovoltaic devices, it is possible to compare amounts of power generation of the power generation devices 100 and control malfunction. Also, the upper server 400 may provide the data received from the photovoltaic device 100 or the data collection device 300 and a graph for monitoring to users. For example, the upper server 400 may provide the amount of photovoltaic power generation and related data received from the data collection device 300 to users. Also, the upper server 400 may provide users with the graph for monitoring that is received from the data collection device 300. Also, the upper server 400 may make the graph for monitoring based on the amount of photovoltaic power generation and related data that is received from the data collection device 300, and provide the graph to users.

Figure 7:
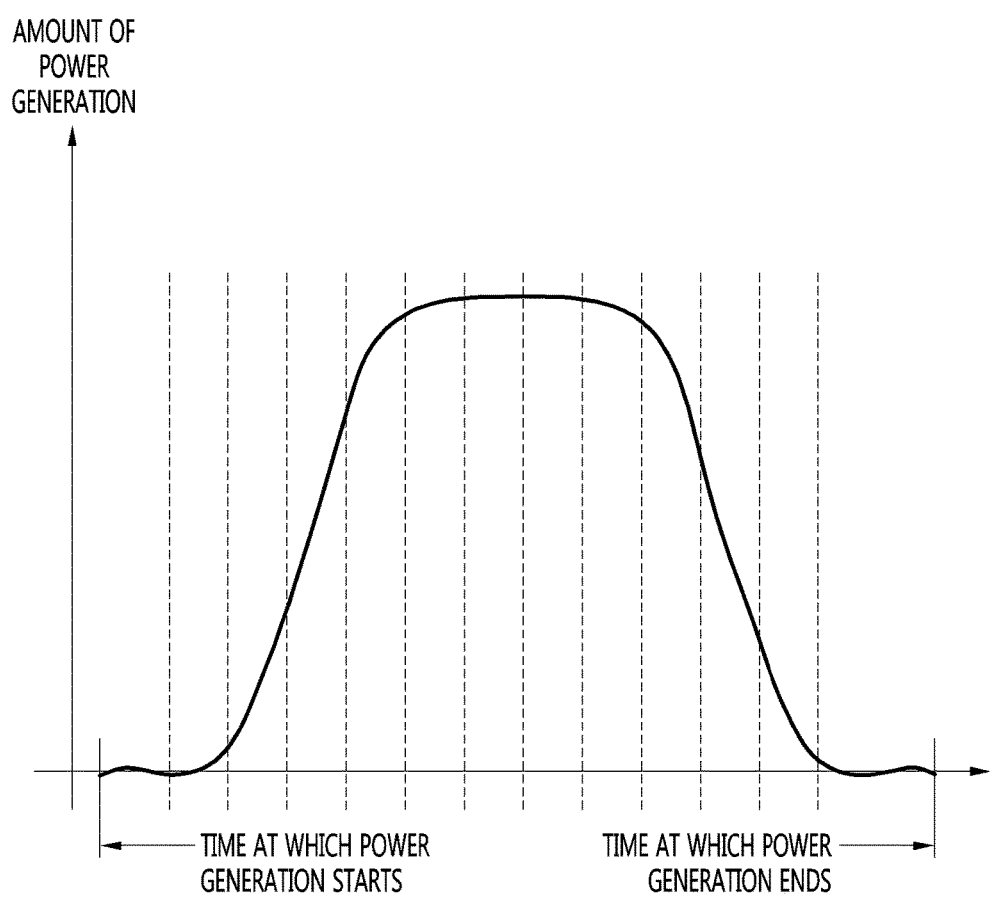
FIG. 7 is a diagram that represents a result of monitoring of photovoltaic power generation using a typical method.

FIG. 7 is a diagram that represents a result of monitoring of photovoltaic power generation using a typical method.

For the monitoring of the photovoltaic power generation, the data collection device 300 has typically collected data needed for monitoring from a solar inverter and various sensors. In addition, the control unit 315 of the data collection device 300 may provide users with a result of monitoring that is based on the collected data, or deliver the result of monitoring to the upper server.

However, the data collection device 300 has typically collected an amount of photovoltaic power generation at a certain time interval (e.g., every five minutes) to monitor the amount of photovoltaic power generation, as shown in FIG. 7. When a typical method is used, there is an advantage in accuracy because an amount of power generation is continuously received at a short interval.

According to the typical method, a transmission data amount increases because all amounts of power generation are transmitted at intervals. Thus, communication charge increases in proportion to the increased data amount. Also, in the case of transmission using wireless communication, there are limitations in that a situation in which it is difficult to transmit data occurs or extra money is needed to install an amplifier in order to supplement low communication quality, when transmission is performed in a region where communication quality is low.

In the following, a photovoltaic device that supplements typical limitations is described with reference to FIGS. 8 to 11.

Figure 8:
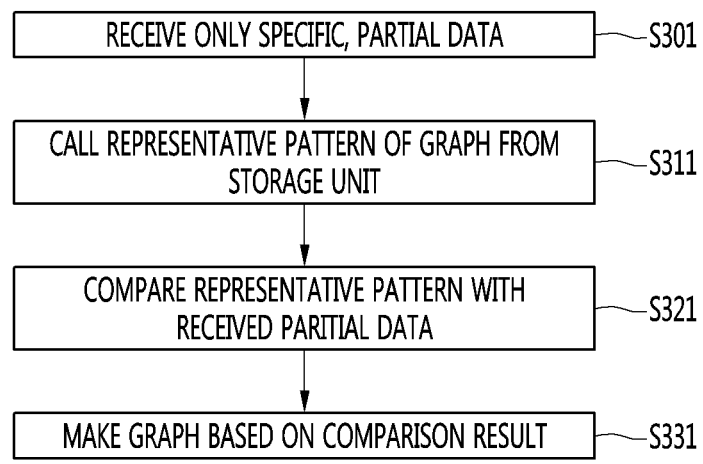
FIG. 8 is a flowchart of monitoring an amount of photovoltaic power generation according to an embodiment.

FIG. 8 is a flowchart of monitoring an amount of photovoltaic power generation according to an embodiment.

The transceiver 316 of the data collection device 300 receives only specific partial data on photovoltaic power generation from the inverter 103 of the photovoltaic device 100, in step S301. The specific data may be a time at which power generation starts, a time at which power generation ends, and a maximum amount of power generation. Furthermore, it is also possible to receive position information on the photovoltaic device. The position information may be latitude and longitude information. By receiving only minimum data and not entire data on an amount of photovoltaic power generation, it is possible to reduce communication charge for data delivery. Also, even when communication quality is low, it is possible to reduce the burden of data delivery because there is a little amount of data.

In another embodiment, the transceiver 316 may also receive only a maximum amount of power generation. In particular, the times at which power generation starts and ends may be found based on previously input position data on the photovoltaic device. Since photovoltaic power generation is directly concerned in sunrise and sunset times, it is possible to find sunrise and sunset times according to the position data to infer the time at which power generation starts and ends.

In an embodiment, the control unit 315 of the data collection device 300 may use pre-stored position information to find the times at which power generation starts and ends with reference to a table related to sunrise and sunset. Since data on sunrise and sunset is already accumulated for each region, it is possible to put and use the data into a table. The table may be stored in the storage unit 317. In this case, the data collection device 300 may receive, along with power generation amount information, information for identifying a power generation device transmitting the power generation amount information and the control unit 315 may obtain position information on the photovoltaic device 100 based on identification information.

In another embodiment, the control unit 315 may calculate sunrise and sunset times based on position information. The control unit 315 may find times at which photovoltaic power generation starts and ends by using an algorithm that calculates sunrise and sunset according to latitude, longitude, and a date.

The control unit 315 calls a representative pattern of a photovoltaic power generation amount graph from the storage unit 121, in step S311. This process is described in more detail with reference to FIG. 9.

Figure 9:
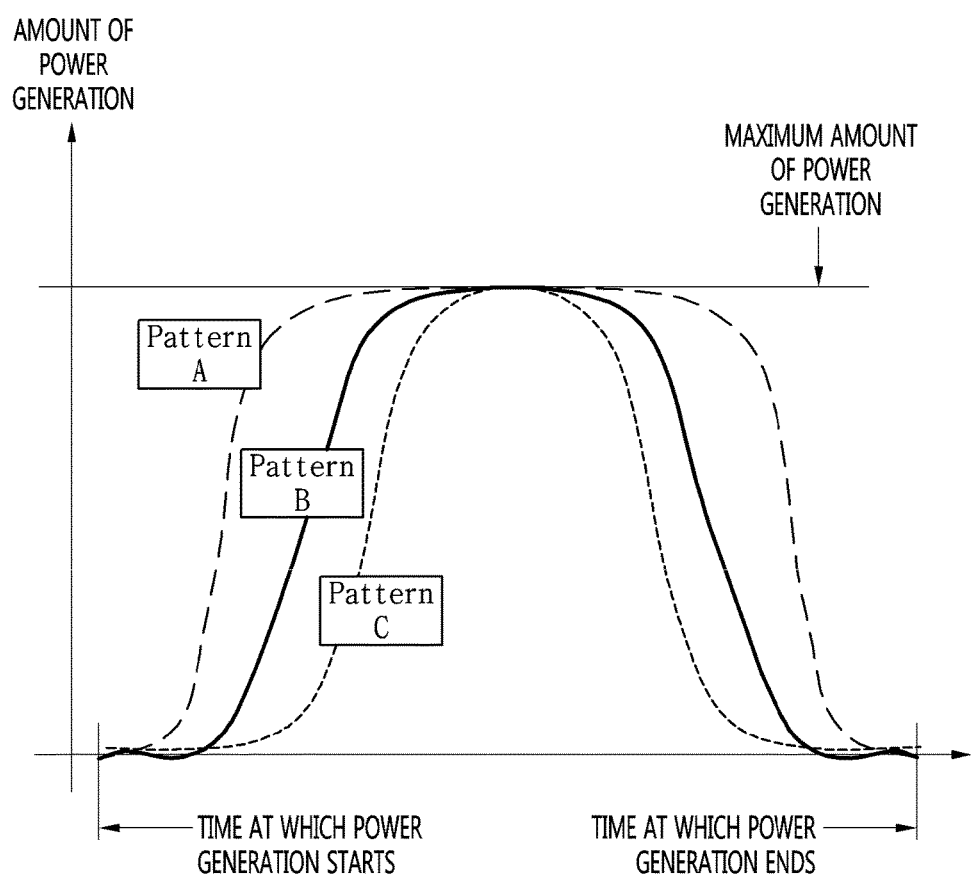
FIG. 9 is a diagram that represents how to make a power generation graph based on a representative pattern.

FIG. 9 is a diagram that represents how to make a power generation amount graph based on a representative pattern.

Referring to FIG. 9, a pattern A, a pattern B, and a pattern C may be stored in the storage unit as representative patterns in an embodiment. Regarding the number of stored patterns, a relatively large number of patterns may be stored in a region where climate frequently varies (e.g., Korea) and a relatively small number of patterns may be stored in a region where climate rarely varies (e.g., desert). Corresponding patterns may be stored upon the initial system design or may be newly stored according to a position at which the photovoltaic device is installed, during operation.

The pattern A is a pattern in which a time at which power generation starts is earliest and values close to a maximum amount of power generation are maintained for a long time. A corresponding pattern may be a power generation amount pattern that corresponding to summer in which there is a lot of sunshine and day is relatively long. The pattern C is a pattern in which the time at which power generation starts is latest and values close to a maximum amount of power generation are short. A corresponding pattern may be a power generation amount pattern that corresponding to winter in which there is less sunshine and day is relatively short.

Since an amount of photovoltaic power generation fundamentally varies according to sunshine, it is possible to empirically perceive that daily power generation amount has almost the same pattern. Thus, it is possible to store representative patterns in the storage unit 317, receive only representative values that may select patterns, and select patterns closest to the received representative values to make a graph for monitoring.

Refer back to FIG. 8.

The control unit 315 compares the received time at which power generation starts, the received time at which power generation ends, and the received maximum amount of power generation with a graph called from the storage unit 317, in step S321. In particular, since each stored pattern has times at which power generation starts and ends as characteristics, it is possible to compare the received data with stored patterns to select the most similar pattern. For example, when the times at which power generation starts and ends have smallest differences from the pattern A, the control unit 315 may select the pattern A.

In another embodiment, the control unit 315 may preferentially select a graph that has been selected most recently, when received data has a difference difficult to distinguish from two or more patterns. For example, when the currently received data has an intermediate value between the patterns A and B and thus it is difficult to select, it is possible to select the pattern B as a result of comparison if a graph for monitoring is made based on the pattern B for the past one week.

The control unit 315 makes a graph for monitoring base don a result of comparing the received specific data with a graph pattern called from the storage unit 317, in step S331. In an embodiment, a corresponding graph may be made in the photovoltaic device 100. In another embodiment, the corresponding graph may be made through a higher server. In the latter case, the photovoltaic device 100 may transmit the made graph, and it may transmit only specific data for making the graph and the higher server may select a graph pattern to make the graph.

Figure 10:
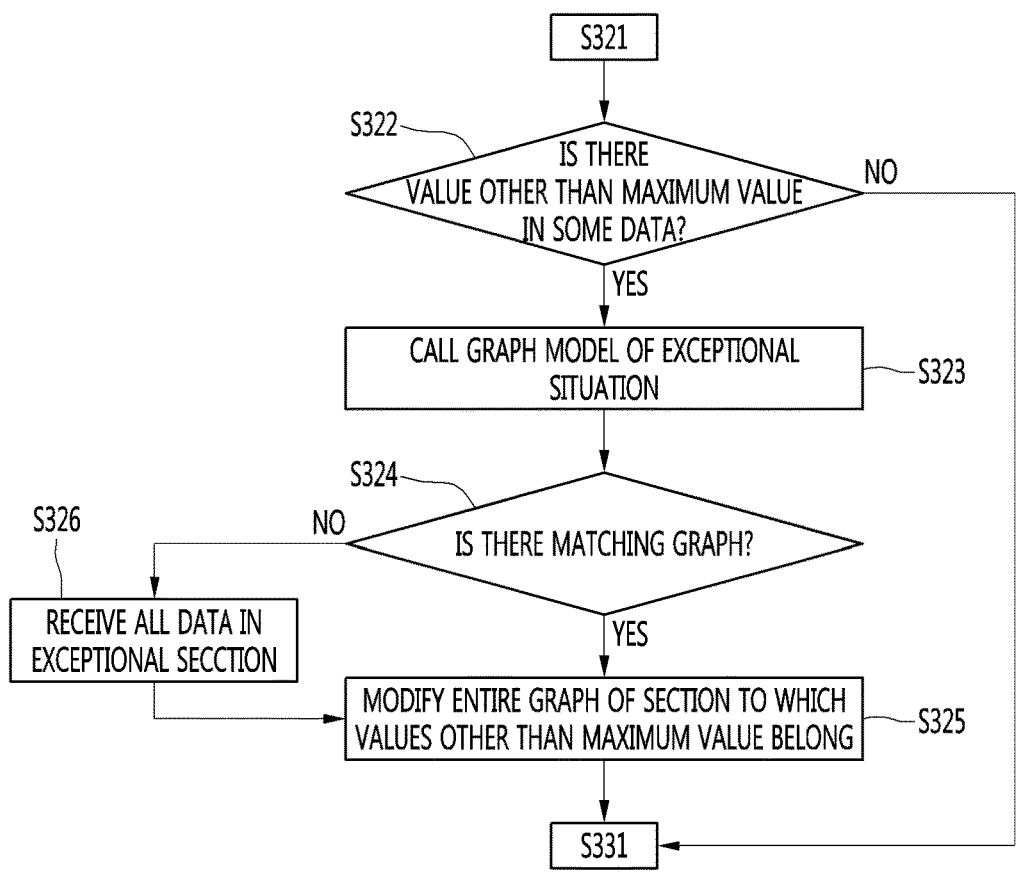
FIGS. 10 and 11 represent processes of monitoring when received data includes additional values other than a maximum amount of power generation.
Figure 11:
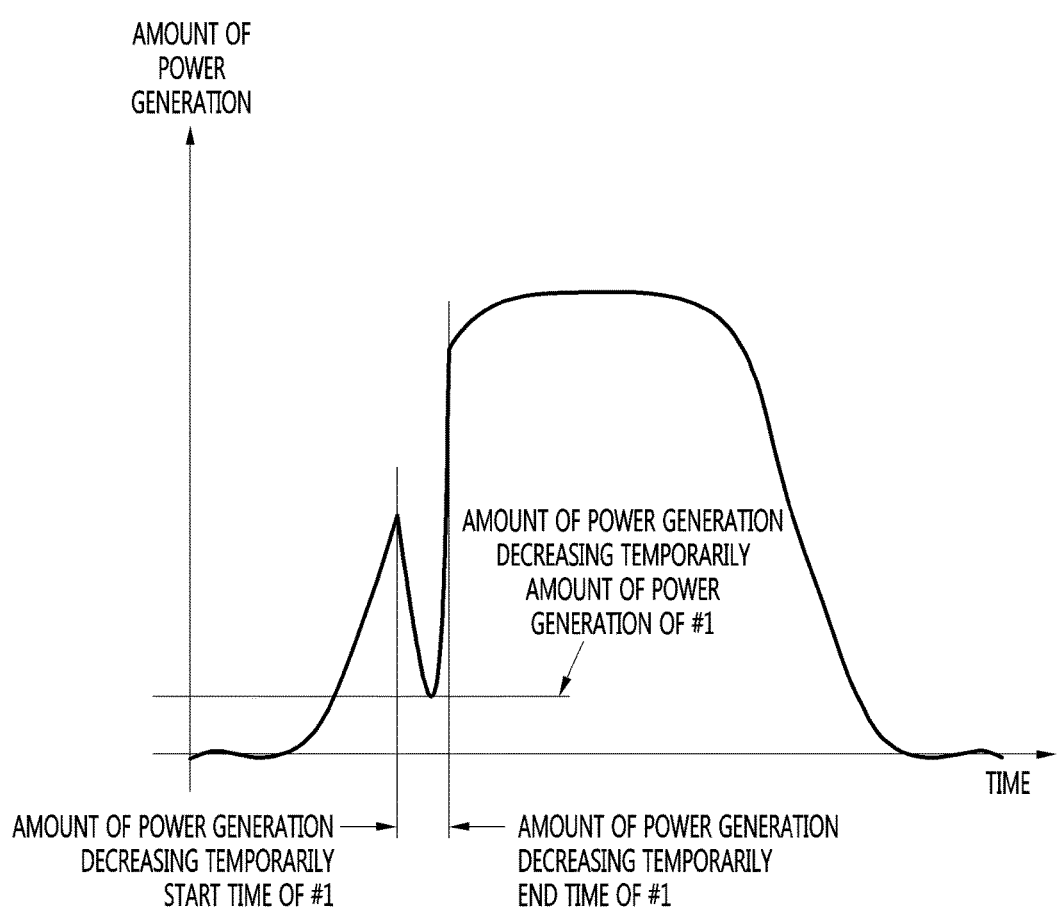

FIGS. 10 and 11 represent processes of monitoring when received data includes additional values other than a maximum amount of power generation.

In the process in which the control unit 315 compares the received data with a graph in step S321 in FIG. 8, it is determined whether there are values other than the maximum amount of power generation in data, in step S322. Since an amount of photovoltaic power generation fundamentally has almost a constant pattern, it is possible to make a rough graph if there is data on a maximum amount of power generation, and there may be sections that represent accidental values according to a climate condition. For example, in the case that it has rained from 9 AM to 11 AM, sunshine decreases while it rains and thus an amount of power generation has no choice but to decrease in proportion thereto. In this case, since there are sections that have different values from stored patterns, there may be a need to make a graph to reflect it.

In an embodiment, when it is determined that there are no values other than a maximum amount of power generation, the control unit 315 returns to step S331 to make a graph.

In another embodiment, the control unit 315 determines that there are values other than the maximum amount of power generation, a graph model for an exceptional situation is called from the storage unit 317, in step S323. For example, the graph for the exceptional situation may be a pattern for a rainy situation or a cloudy situation. The storage unit 317 may store a representative pattern for each weather situation based on accumulated data.

The control unit 315 compares another of the received values with the graph for the exceptional situation that is called from the storage unit 317, in step S314. In an embodiment, the received data may be data on from a time at which power generation starts to a time at which an amount of power generation decreases before reaching the maximum amount of power generation. Also, it may be data on a time at which the amount of power generation recovers since a time at which the amount of power generation decreases. In addition, it may be data on a minimum amount of power generation in each exceptional situation section.

The system control unit 315 may compare information on a section where there is a variation in amount of power generation, with the data on the minimum amount of power generation to select a closest pattern.

In an embodiment, when data on the exceptional section matches with a representative pattern, a corresponding pattern is selected to modify the graph of the exceptional section in step S325. In particular, it is possible to apply a minimum value to the received exceptional section to employ a matching graph pattern to modify the entire graph.

The above steps are described in more detail with reference to FIG. 11.

As shown in FIG. 11, a section #1 at which an amount of photovoltaic power generation varies may be represented in an embodiment according to a weather condition. In this case, the control unit 315 may receive data on the start time of #1, the end time of #1, and the minimum amount of power generation of #1 through the transceiver 316. The control unit 315 may call a graph pattern for an exceptional situation from the storage unit as described above, and make a power generation amount graph for monitoring according to the most similar pattern.

In another embodiment, there may be no matching patterns as a result of comparing a value for the exceptional section with a representative pattern for the exceptional situation. For example, there may be a case where it is difficult to accurately make a graph with only a minimum power generation value because the exceptional section has a significant variation in amount of power generation. In this case, the control unit 315 receives all data on the exceptional section through the transceiver 316 in step S326.

In particular, referring to FIG. 11, the control unit 315 receives data on an entire amount of power generation from the start time of #1 to the end time of #1 through the transceiver 316. In this case, there is a burden to have to receive more data than when referring to a representative pattern of a graph, but by receiving only data on some sections without receiving data on all sections in a typical manner, it is possible to make a graph almost matching with actual data by using relatively less data.

Referring back to FIG. 10, data on an exceptional section is received to modify the entire graph in the same manner in step S325. The process of making the graph in FIG. 10 may also be performed within the photovoltaic device 100 or by a higher server.

The data monitoring method as described above may be used for all data that has a constant pattern, such as sunshine or temperature, as well as an amount of photovoltaic power generation.

When delivering data on the amount of photovoltaic power generation, it is possible to roughly monitor an amount of power generation even without delivering all data, thereby reducing communication charge and efficiently performing monitoring in a region where communication is not easily allowed.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a variation are included in the scope of embodiments.

Embodiments are mostly described above. However, they are only examples and do not limit the present disclosure. A person skilled in the art may appreciate that many variations and applications not presented above may be implemented without departing from the essential characteristic of embodiments. For example, each component particularly represented in embodiments may vary. In addition, it should be construed that differences related to such a variation and such an application are included in the scope of the present disclosure defined in the following claims.

What is claimed is:

1. A data collection device for photovoltaic power generation, the data collection device comprising:
   a receiver receiving data on an amount of photovoltaic power generation, the received data comprising information indicating:
      a maximum peak of power generation with respect to a period,
      a starting time of the period at which the power generation starts, and
      an ending time of the period at which the power generation ends;
   a storage unit storing a plurality of representative patterns of a graph for monitoring the amount of photovoltaic power generation;
   a control unit making a graph for monitoring the amount of photovoltaic power generation based on the information indicating the maximum peak of power generation and a selected representative pattern of the plurality of representative patterns stored in the storage unit; and
   a transmitter transmitting the graph made by the control unit to an external device,
   wherein each representative pattern of a graph of the plurality of representative patterns of a graph comprises a unique combination of a respective maximum peak of power generation and a corresponding pattern period with a pattern start time at which power generation starts and a pattern end time at which power generation ends; and
   wherein the control unit selects the representative pattern by comparing the maximum peak of power generation, the starting time, and the ending time with the respective maximum peak of power generation, pattern start time, and pattern end time, respectively, of each of the plurality of representative patterns and selecting the representative pattern having a smallest difference between the maximum peak of power generation and the maximum peak of the selected representative pattern and a most similar power generation period based on the starting time as compared to the pattern start time of the selected representative pattern, and the ending time as compared to the pattern end time of the selected representative pattern.

2. The data collection device according to claim 1, wherein the control unit selects the representative pattern by further selecting a most recently selected pattern of the plurality of representative patterns.

3. The data collection device according to claim 1, wherein the receiver further receives data comprising information indicating an exceptional section start time, an exceptional section end time, and a minimum amount of power generation within an exceptional section.

4. The data collection device according to claim 3, wherein the control unit compares the information indicating the exceptional section start time, the exceptional section end time, and the minimum amount of power generation within the exceptional section with a second representative pattern of the plurality of representative patterns to modify an entire graph.

5. The data collection device according to claim 4, wherein the control unit receives power generation amount data on all exceptional sections to make the entire graph.

6. A photovoltaic system comprising:
a photovoltaic device absorbing and converting solar energy into electrical energy and transmitting converted photovoltaic power generation amount and related data; and
a solar data collection device comparing the photovoltaic power generation amount and related data received from the photovoltaic device and making a graph for monitoring photovoltaic power generation based on a result of comparison,
wherein the solar data collection device comprises:
a receiver receiving data on an amount of photovoltaic power generation and related data, the received data comprising information indicating:
a maximum peak of power generation with respect to a period,
a starting time of the period at which the power generation starts, and
an ending time of the period at which the power generation ends;
a storage unit storing a plurality of representative patterns of a graph for monitoring the amount of photovoltaic power generation; and
a control unit making the graph for monitoring the amount of photovoltaic power generation based on the information indicating the maximum peak of power generation and a selected representative pattern of the plurality of representative patterns stored in the storage unit,
wherein each representative pattern of a graph of the plurality of representative patterns of a graph comprises a unique combination of a respective maximum peak of power generation and a corresponding period with a start time at which power generation starts and an end time at which power generation ends; and
wherein the control unit selects the representative pattern by comparing the maximum peak of power generation, the starting time, and the ending time with the respective maximum peak of power generation, pattern start time, and pattern end time, respectively of each of the plurality of representative patterns and selecting the representative pattern having a smallest difference between the maximum peak of power generation and the maximum peak of the selected representative pattern and a most similar power generation period based on the starting time as compared to the pattern start time of the selected representative pattern, and the ending time as compared to the pattern end time of the selected representative pattern.

7. The photovoltaic system according to claim 6, further comprising an external device that controls the solar data collection device and collects data from the photovoltaic device.

8. The photovoltaic system according to claim 7, wherein the external device makes a graph for monitoring photovoltaic power generation based on the data collected from the photovoltaic device.

9. The photovoltaic system according to claim 7, wherein the external device provides a user with the data collected from the photovoltaic device or the graph for monitoring photovoltaic power generation.

10. A data collection device for photovoltaic power generation, the data collection device comprising:
a receiver receiving data on an amount of photovoltaic power generation, the received data comprising information indicating:
a maximum peak of power generation with respect to a period, and
a latitudinal and longitudinal position of the photovoltaic device; and
a storage unit storing a plurality of representative patterns of a graph for monitoring the amount of photovoltaic power generation;
a control unit estimating a starting time at which the power generation starts and an ending time at which the power generation ends based on the latitudinal and longitudinal position of the photovoltaic device, and making a graph for monitoring the amount of photovoltaic power generation based on the information indicating the maximum peak of power generation and a selected representative pattern of the plurality of representative patterns stored in the storage unit; and
a transmitter transmitting the graph made by the control unit to an external device,
wherein each representative pattern of a graph of the plurality of representative patterns of a graph comprises a unique combination of a respective maximum peak of power generation and a corresponding period with a pattern start time at which power generation starts and a pattern end time at which power generation ends; and
wherein the control unit selects the representative pattern by comparing the maximum peak of power generation, the starting time, and the ending time with the respective maximum peak of power generation, patter start time, and pattern end time, respectively of each of the plurality of representative patterns and selecting the representative pattern having a smallest difference between the maximum peak of power generation and the maximum peak of the selected representative pattern and a most similar power generation period based on the starting time as compared to the pattern start time of the selected representative pattern, and the ending time as compared to the pattern end time of the selected representative pattern.

* * * * *